United States Patent
Mabie et al.

(10) Patent No.: US 9,715,020 B2
(45) Date of Patent: Jul. 25, 2017

(54) RADIOPHARMACEUTICAL CONCENTRATION MEASUREMENT SYSTEM AND METHOD

(75) Inventors: Marc A. Mabie, Pittsburgh, PA (US); Larry McCutchan, Allison Park, PA (US); Chad E. Bouton, Powell, OH (US); James E. Dvorsky, Plain City, OH (US)

(73) Assignee: BAYER HEALTHCARE LLC, Whippany, NJ (US)

( * ) Notice: Subject to any disclaimer, the term of this patent is extended or adjusted under 35 U.S.C. 154(b) by 1134 days.

(21) Appl. No.: 13/639,623

(22) PCT Filed: Apr. 11, 2011

(86) PCT No.: PCT/US2011/031949
§ 371 (c)(1),
(2), (4) Date: Jan. 17, 2013

(87) PCT Pub. No.: WO2011/127469
PCT Pub. Date: Oct. 13, 2011

(65) Prior Publication Data
US 2013/0124103 A1 May 16, 2013

Related U.S. Application Data

(60) Provisional application No. 61/322,555, filed on Apr. 9, 2010.

(51) Int. Cl.
G01T 1/167 (2006.01)
G01T 1/20 (2006.01)
G01T 7/02 (2006.01)

(52) U.S. Cl.
CPC ............. *G01T 1/167* (2013.01); *G01T 1/20* (2013.01); *G01T 7/02* (2013.01)

(58) Field of Classification Search
CPC ................................................. G01T 1/167
See application file for complete search history.

(56) References Cited

U.S. PATENT DOCUMENTS

| 4,409,488 A | 10/1983 | King |
| 4,853,546 A | 8/1989 | Abe |

(Continued)

FOREIGN PATENT DOCUMENTS

| JP | 2006288515 | 10/2006 |
| WO | 9635131 A1 | 11/1996 |

(Continued)

OTHER PUBLICATIONS

Notification of Transmittal of the International Search Report and the Written Opinion of the International Searching Authority for counterpart priority PCT Application No. PCT/US11/31949.

(Continued)

*Primary Examiner* — Manuel Rivera Vargas
(74) *Attorney, Agent, or Firm* — Joseph L. Kent; David Schramm; James R. Stevenson

(57) ABSTRACT

A system and method for measuring a radioactive concentration of a radiopharmaceutical is disclosed. The system includes a container, an interrogation region associated with the container, a radiation detector, a signal capture device, and a microprocessor system. The radiation detector focuses radiation emitted from the interrogation region, a measurement of which is then obtained by the signal capture device. The microprocessor system is in data communication with the signal capture device, and is capable of calculating the radioactive concentration of the radiopharmaceutical contained in the interrogation region from the radiation measurement obtained by the signal capture device.

16 Claims, 11 Drawing Sheets

(56) References Cited

U.S. PATENT DOCUMENTS

| | | |
|---|---|---|
| 4,968,305 A | 11/1990 | Takahashi et al. |
| 4,994,012 A | 2/1991 | Nakayama et al. |
| 6,362,472 B1 | 3/2002 | Yarnell et al. |
| 6,767,319 B2 | 7/2004 | Reilly et al. |
| 2002/0168317 A1 | 11/2002 | Daighighian et al. |
| 2004/0054248 A1 | 3/2004 | Kimchy et al. |
| 2004/0260143 A1 | 12/2004 | Reilly et al. |
| 2008/0166292 A1* | 7/2008 | Levin .......... A61M 5/1723 424/1.11 |
| 2008/0177126 A1 | 7/2008 | Tate et al. |
| 2009/0131862 A1 | 5/2009 | Buck |

FOREIGN PATENT DOCUMENTS

| | | | |
|---|---|---|---|
| WO | 9635151 A1 | 11/1996 | |
| WO | WO 9635131 A1 * | 11/1996 | ............ G01T 7/00 |
| WO | 2004004787 | 1/2004 | |

OTHER PUBLICATIONS

Podgorsak M B et al: "The half-life of high dose rate Ir-192 sources", Database accession No. 4571674 ; & Medical Physics USA, vol. 20, No. 4 , pp. 1257-1259, ISSN: 0094-2405.

* cited by examiner

RADIOPHARMACEUTICAL CONCENTRATION MEASUREMENT SYSTEM AND METHOD

CROSS REFERENCE TO RELATED APPLICATION

This application is a 371 national phase application of PCT International Application No. PCT/US2011/31949, filed on Apr. 11, 2011, and designating the United States of America, which claims the benefit of U.S. Provisional Application Ser. No. 61/322,555, filed on Apr. 9, 2010, the contents of which are incorporated herein by reference.

BACKGROUND OF THE INVENTION

The present invention relates to delivery methods, systems, and components thereof, for use with radiopharmaceutical materials, and especially with methods and components used for the determination of the specific activity or radiation concentration of a radiopharmaceutical material for delivery.

Radiopharmaceutical materials are well known in the medical field for both therapeutic as well as diagnostic purposes. Encapsulated radiopharmaceutical materials (as "seeds") have been inserted into solid tumors such as prostate tumors to irradiate and thereby kill the tumor cells. Brief exposure of luminal cells in blood vessels to radioactive materials (held in place with a balloon catheter) after angioplasty has been used to reduce the incidence of restenosis in the blood vessel.

In addition to these therapeutic uses, radiopharmaceuticals can act as tracers in specific imaging techniques to help diagnose tissues requiring medical intervention. Two such imaging techniques are positron emission tomography (PET) and single photon emission computed tomography (SPECT). In PET imaging, a radiopharmaceutical that carries a positron emitting nuclide (such as $^{18}F$) is injected into a patient's vasculature. The positron emitted by the radionuclide collides with electrons in its vicinity, releasing a pair of gamma rays with opposing trajectories. The paired gamma rays are detected by sensors disposed on opposite sides of the patient, and the location of the radiopharmaceutical is thus determined. As an example, $^{18}F$-flourodeoxyglucose (FDG) is routinely used to detect tumor cells which preferentially take up the FDG. In SPECT imaging, the radiopharmaceutical carries a radionuclide that emits a single gamma ray photon during its disintegration. As with PET, the gamma ray is detected by sensors disposed about a patient and the location of the radiopharmaceutical is determined. As a non-limiting example, $^{99m}Tc$ sestamibi is administered into a patient's vasculature and monitored as the nuclide passes through the heart. This method provides a cardiologist with information regarding how well the heart is able to eject blood from the ventricles.

While the radiation dose from a diagnostic radiopharmaceutical is minimal for a single patient undergoing a single imaging procedure, the cumulative dose for either a medical technologist or physician who injects the tracer may be substantial. This is due to the number of patients the technologist or physician is required to inject on a daily basis. Consequently, a number of devices have been developed in order to help shield the physician or technologist from excess exposure to the radiopharmaceuticals. For manual injection of a radiopharmaceutical, syringes have been developed that incorporate shielding material in the body of the syringe (U.S. Pat. No. 4,968,305 to Takahashi et al.), and hand held shielded syringe holders have also been developed (U.S. Pat. No. 4,994,012 to Nakayama et al.). In addition to such manual devices, automated devices have also been described. Examples of such devices are found in U.S. Pat. No. 6,767,319 to Reilly et al. (herein incorporated by reference), PCT patent application publication WO 2004/004787 (Van Naemen et al., herein incorporated by reference), EPO patent application publication EP 1,616,587 (Buck, herein incorporated by reference), and U.S. patent application publication 2008/0177126 (Tate et al., herein incorporated by reference). While the application for these devices is primarily directed to PET imaging (and more specifically the use of FDG), similar style devices may be used for injecting SPECT radiopharmaceuticals for SPECT imaging procedures.

Referring to Buck and Tate et al. specifically, the automated injectors comprise in general the following components. A bulk source of a radiopharmaceutical such as a vial or other container is disposed within a shielded environment within the injector. A needle, cannula, or other access device is inserted into the container to allow access to the radiopharmaceutical material. A fluid pathway is further provided from the access device to a first pumping device which may include a syringe and activator, or peristaltic pump. A source of a nonradioactive flushing material such as saline is also provided with a second fluid path, which may be connected to a second pumping device, or may be in fluid communication with the first pumping device through a valve mechanism. In the example using a second pumping device, the output thereof may be in fluid communication with the output of the first pumping device via an auxiliary valve mechanism. The output end of the first pumping device is in fluid communication with a third fluid pathway which is disposed to pass through a radiation detector device such as an ion chamber. The third fluid pathway is connected to a second valve mechanism that controls the direction of the fluid therein to either a waste container, or to a delivery device which may deliver the radiopharmaceutical material to a receptacle or to a patient for medical purposes. A computer running appropriate software is able to control the actions of the first and second pumping devices via motor control devices, and in addition control the valve mechanisms. The injection device may also comprise a monitor to display information to a user (such as the amount of radiation detected by the radiation detector), as well as an input device to the computer (such as a keyboard) that permits the user to enter information regarding the operation of the injector.

From a functional perspective, such an automated device may be used in the following manner. A technologist or physician may load a bulk container or vial prefilled with a solution containing a radioactive material into a shielded receptacle in the injector. The amount of radioactive material such as specific activity (reported for example as Bq or Ci per unit volume) may be imprinted on a label of the prefilled vial. Alternatively, the total activity of the vial (as Bq or Ci) may be presented on a vial with a known or presumed volume of fluid. Once the prefilled vial or container is loaded into the shielded receptacle, an access device is inserted into the container either manually by the physician or technologist, or automatically by the injector. Similarly, a source of the non-radioactive flushing material, for example from a container or a hanging bag, is provided as well. The physician or technologist may then connect the flushing material to a second fluid pathway provided in the injector. The various fluid paths within the injector may be purged of air using the non-radioactive flushing material by means of a pumping process. The air purging process results in the fluid paths being filled with the flushing material, so no air is present for use. Thereafter, the physician or technologist activates the injector in a manner to provide a dose of the radiopharmaceutical for delivery. A variety of methods may be chosen to program the injector to deliver the amount of radiation required for delivery. For example, the physician or technologist user may enter a total delivery volume of radiopharmaceutical via the interface device on the injector. Alternatively, the user may enter the total radiation activity for a final dose. In such an example, the software in the injector computer would have information regarding the specific activity of the liquid in the radiopharmaceutical source and perform such calculations so as to determine the final volume to deliver. If a human patient is the recipient of the dose, parameters related to the patient (such as height and weight) may be input into the injector. In such an example, the software in the injector computer may use such information to determine the proper amount of radiopharmaceutical to deliver as an activity, and thereafter compute the total volume from the radiopharmaceutical source to deliver. These examples are not taken as exhaustive, and other methods may be used to program the injector to deliver a particular volume of the radiopharmaceutical for delivery.

Once the volume of radiopharmaceutical has been determined, the injector energizes the appropriate pumping mechanisms to transfer the required volume from the container sourcing the radiopharmaceutical into the third fluid path from the first pumping mechanism. A pumping method is then activated to pump the flushing fluid from the flushing fluid source into the third fluid pathway such that the bolus of the flushing fluid acts to push the dose of radiopharmaceutical along the fluid path. By this means, the dose of radiopharmaceutical progresses along the third fluid pathway until it enters into proximity of the radiation detector. As described in Tate et al., such a radiation detector may comprise an ion detector. Such an ion detector is briefly described as an enclosed container with a central anode and a collecting cathode between which an electrical potential is applied. The detector container is filled with a detecting gas (such as argon). When the radiation emitted by the radiopharmaceutical enters the ion detector, it ionizes some of the gas which results in positive and negative charges. The negative charges are attracted to the collecting anode, and a current is thereby created from the charged particles. The current produced by the radiation detector is then further processed by electronics and software to provide a reading of the number of disintegrations per second (as Bq or Ci) measured. As a result, the injector is provided direct information regarding the amount of radiation provided by the dose of radiopharmaceutical being delivered by the injector. As described in Buck, if the measured activity of the dose does not constitute a sufficient quantity of radiopharmaceutical, the injector can be programmed to provide a second dose, which in conjunction with the first, will provide the correct amount of radioactive pharmaceutical to be dispensed.

Once the correct volume of radiopharmaceutical is present in the third fluid path, the complete radiopharmaceutical dose is pumped out of the injector through a delivery device to its final destination. In the event that a dose has a radiation activity in excess of that required, valve mechanisms can be activated in the injector to dump the dose into a waste repository for removal.

As described in the above example of an automated radiopharmaceutical injector, the radiation concentration of the bulk pharmaceutical is presumed by the technologist or user to be correctly provided by labeling information on the bulk vial. This information must be entered into the injector system for dose calculations. It is not unusual for the concentration labeling information to be inaccurate to ±30%. Such inaccuracy may result in patient dosing levels below or greater than those desired. For this reason, it is desirable to include with the injector system, a system for directly measuring the specific activity or radiation concentration of the pharmaceutical as distributed in the bulk container.

SUMMARY OF THE INVENTION

This disclosure describes various embodiments of a system and method for measuring the radioactive concentration of a radiopharmaceutical. In one such embodiment, the system comprises a container, an interrogation region associated with the container, a radiation detector to focus radiation emitted from the interrogation region, a signal capture device capable of obtaining a radiation measurement of the interrogation region, and a microprocessor system in data communication with the signal capture device. The microprocessor system is capable of calculating a radioactive concentration of a radiopharmaceutical emitting radiation contained in the interrogation region from the signal capture device.

The system may further comprise an aperture system having at least one optical element disposed between the interrogation region and the radiation detector. The radioactive concentration of a radioactive nuclide in the interrogation region is provided to the aperture system to control a selection of the at least one optical element. Additionally a collimator may be disposed adjacent to the aperture system. The optical elements may be selected from apertures or attenuating materials. Also, the sensor may include a crystal sized to the exposed area of the interrogation region thereby focused to detect radiation emitted from the interrogation region The method for measuring the radioactive concentration of a radiopharmaceutical in a concentration measuring system including a container including at least an interrogation region, a radiation detector having at least an output to detect radiation emitted from the at least interrogation region, a signal capture device including an electronics input and a digital output, the electronics input being in electrical communication with the radiation detector output, and a microprocessor system in data communication with the signal capture device digital output, includes exposing the detector to radiation emitted by a radiopharmaceutical contained in the at least interrogation region, at least capturing a signal from the radiation detector output through the signal capture device electronics input, converting the signal captured from the radiation detector output into a digital representation thereof, communicating the digital representation from the signal capture electronics digital output to the microprocessor system, analyzing the digital representation using at least one software module resident on the microprocessor system to provide at least one analysis thereof; and calculating the radioactive concentration based on a total radiation value calculated by the at least one analysis.

The method may further includes at least one software module comprises a plurality of software modules. As an addition, the method includes analyzing the digital representation further including calculating a histogram comprising a plurality of energy value and a plurality of numbers of occurrences of each of the plurality of energy values from a plurality of digital representations, windowing the histogram into a at least one energy value and at least one of the number of occurrences of the at least one energy value thereby creating a windowed histogram, integrating the number of occurrences of the at least one energy value in the windowed histogram thereby creating an integrated value, and converting the integrated value into the total radiation value. Also, the integrated value may be further corrected for non-linearity in the digital representation.

Further details and advantages of the various embodiments described in detail herein will become clear upon reviewing the following detailed description of the preferred embodiments in conjunction with the accompanying drawing figures.

DETAILED DESCRIPTION OF THE INVENTION

Figure 1A:
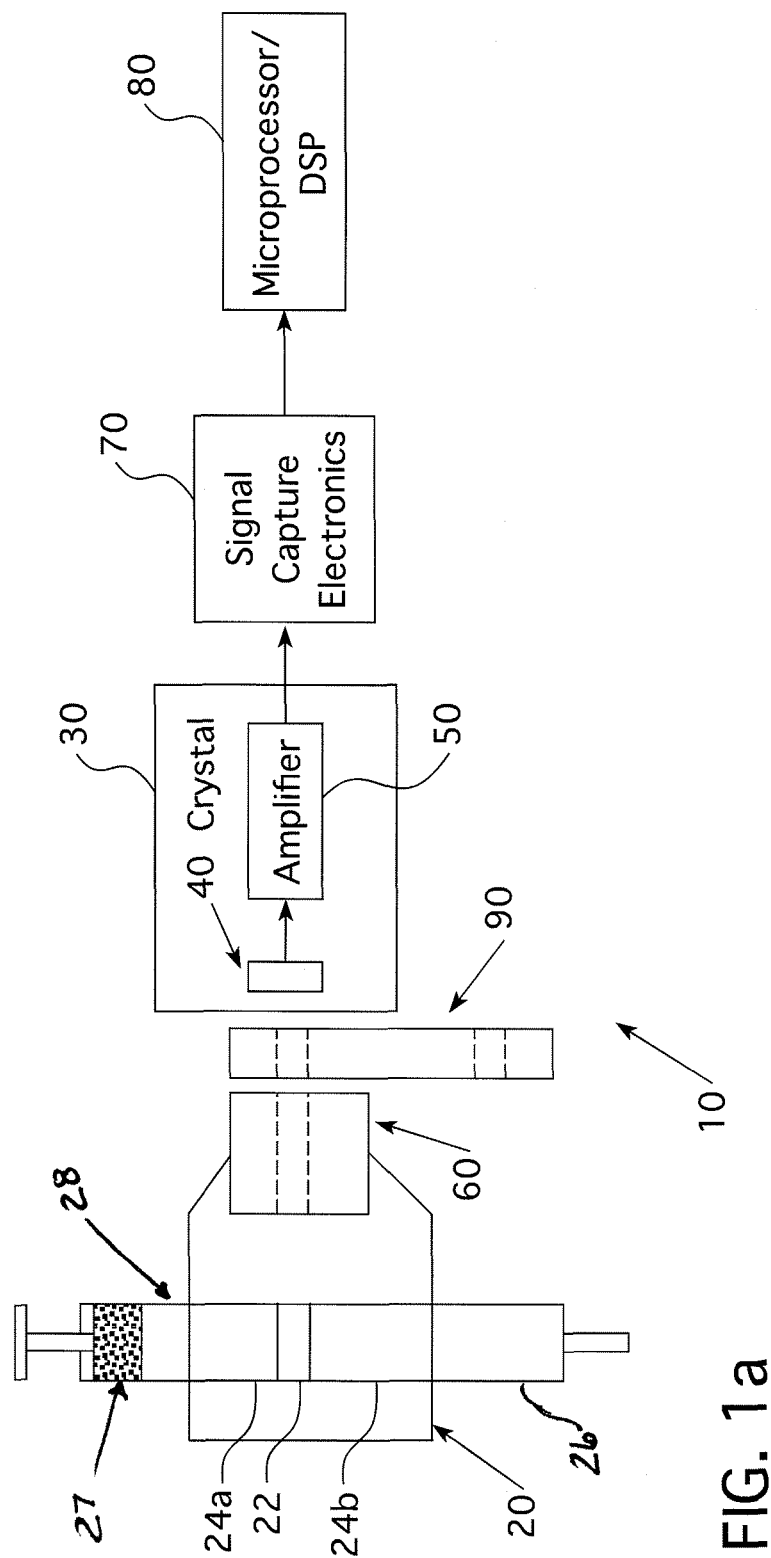
FIG. 1a illustrates a block diagram of a concentration measurement system for a radiopharmaceutical.

FIG. 1a illustrates a block diagram of the radiopharmaceutical activity concentration (or specific activity) measurement system 10. The measurement system comprises a radiopharmaceutical fluid container contained in a holder 20, a radiation detector 30 having at least a crystal sensor 40 and an amplifier 50 disposed at an appropriate distance to detect radioactivity, a collimator disposed between the fluid container and the radiation detector, signal capture electronics 70 that at least digitize the analog signal produced by the detector, and a microprocessor based DSP software subsystem 80 in communication with the output of the detector signal capture electronics. Optionally, an aperture holder 90 may be placed between the collimator and the detector to adjust the radiation flux incident on the detector. The measurement system calculates the radiopharmaceutical activity concentration (hereinafter, the concentration) of the fluid.

Figure 1B:
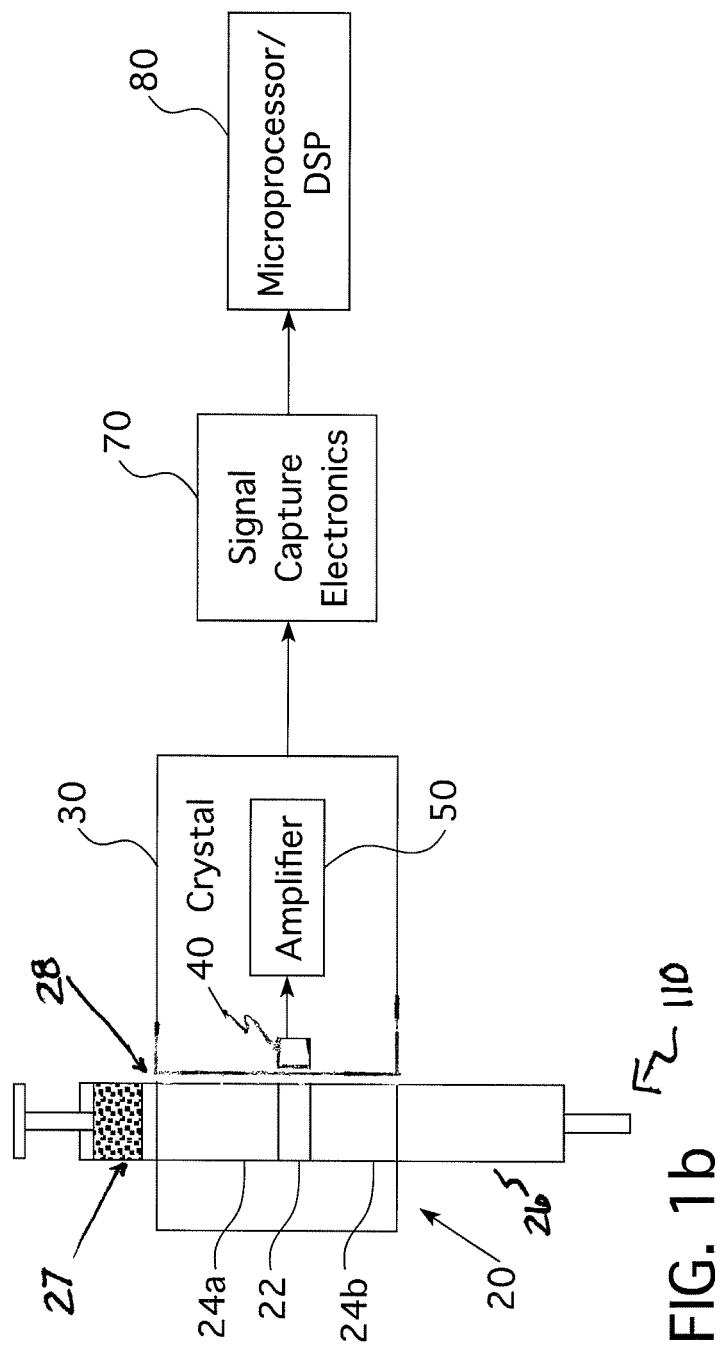
FIG. 1b illustrates a block diagram of an alternate concentration measurement system for a radiopharmaceutical.

Alternatively, FIG. 1b illustrates an alternative measurement system 110 without the optional collimator 60 or aperture holder 90. However, the detector can be appropriately positioned adjacent to the interrogation region 22 so that the crystal 40 abuts optionally to measure the concentration in the interrogation region.

In FIG. 1a, the fluid container 26 may be any appropriate receptacle to hold the radiopharmaceutical during the measurement process, including but not limited to a syringe bag or molded bottle. The fluid container 26 is constructed with any well defined geometry such as a cylinder, with a predetermined, measurable, or defined volume and cross-section. Further, the fluid container 26 is fabricated from a material that both absorbs and scatters a minimal amount of radiation emitted by the radiopharmaceutical contained therein, so that an accurate measurement of the pharmaceutical radiation may be made by the detector. Examples of such material include, low density materials, such as but not limited to, polycarbonate, polyethylene terephthalate, acrylic, or acrylonitrile butadiene styrene. A portion of the fluid container forms an "interrogation region" 22 that is a shielded fixed-volume where the fluid radiation resides. The interrogation region can be examined by the detector.

The fluid container 26 may be located within the fluid container holder 20. This fluid container 26 holder may be composed of a radiation shielding material, preferentially a high density material for example tungsten, to minimize the amount of radiation emitted by the pharmaceutical into the environment. Other embodiments of such high-density material may include, but are not limited to, high specific gravity polymer blends as exemplified by the high density filled polymer compound Trilliant™ HC GRV, supplied by Radiation Protection Technologies. The holder 20 may include a latching mechanism whereby the fluid container 26 can be firmly and releasably held at a fixed geometry with respect to the other system components.

As further illustrated in FIG. 1a, the interrogation region 22 is bounded on either side by a fluid margin 24a, 24b of the radiopharmaceutical fluid. This margin assures continuity of radiation around the interrogation region 22. If an air space 27 is created above the fluid when the fluid container 26 is filled, the air/fluid boundary 28 will cause excess radiation scatter at the boundary, and ultimately lead to an incorrect reading of the specific activity by the detector if the air filled section is close to the interrogation region 22. A sufficient fluid margin around the interrogation region 22 will minimize this effect.

Figure 2:
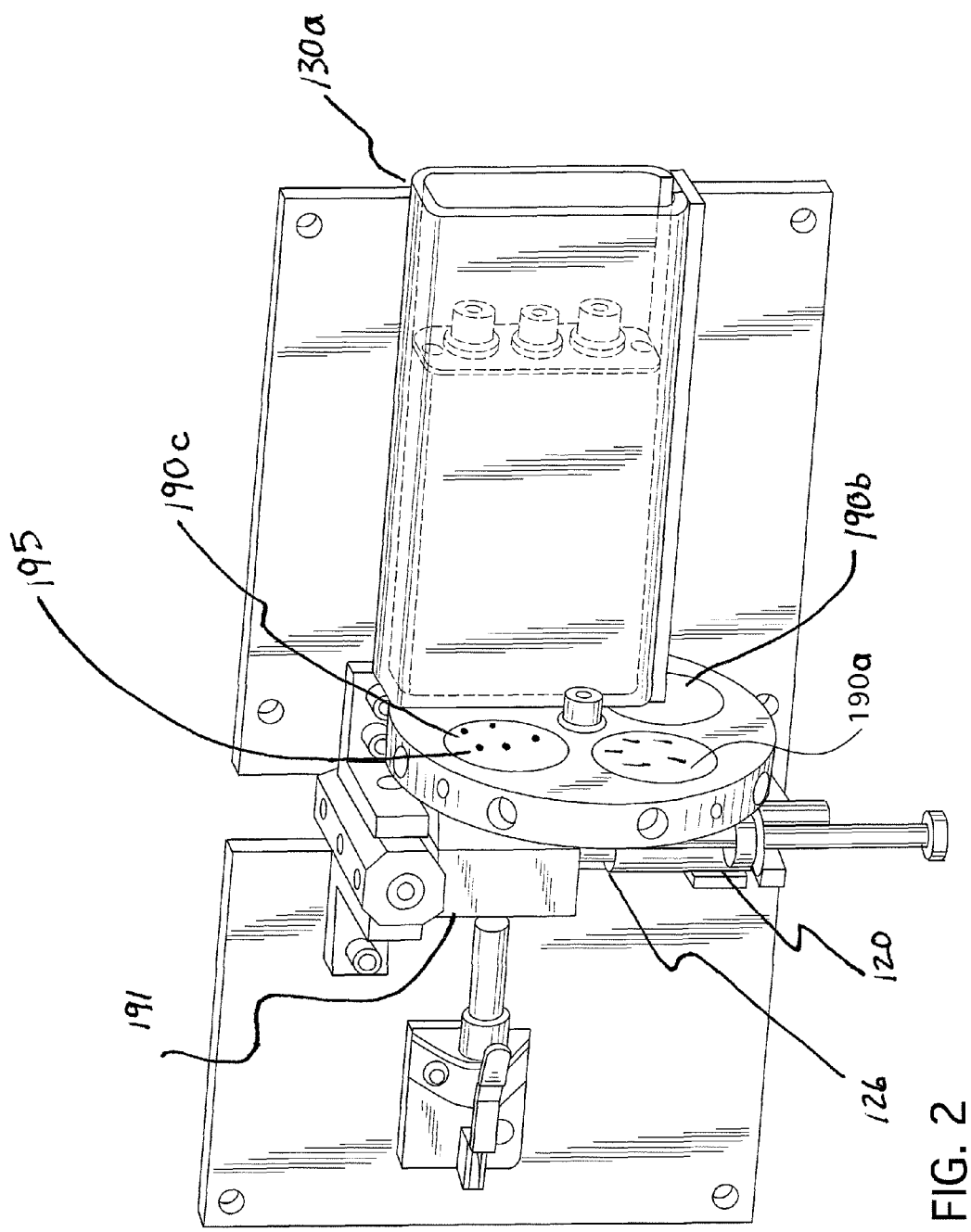
FIG. 2 illustrates a schematic side view of the measurement system mechanics and signal detector.

To achieve a defined predetermined volume or interrogation region, a collimator 60 may be adjacently located or incorporated into the container holder. Alternatively, as shown in FIG. 2, the shielded container holder (and fluid container) may abut against the collimator 60, thereby providing a fixed geometry of the fluid container 26 and the collimator 60 relative to each other. The collimator 60 may be fabricated of any high density material such as, but not limited to tungsten. The collimator 60 functions to limit the radiation measured by the system to that being emitted by a radiopharmaceutical fluid located within the interrogation region of the container 26. An accurate volume of the interrogation region 22 may be obtained based on the collimator length and diameter (forming an optical window into the fluid container), along with known geometry and cross-section of the fluid container. Only radiation emitted from the interrogation region 22 is measured by the detector 30.

In addition, a selectable aperture 90 may optionally be disposed between the collimator and the detector. The selectable aperture may be of any appropriately shaped geometry, including a wheel or slider, with variable openings to allow radiation to pass through. Because radiopharmaceuticals have different radionuclides, such as $^{99m}$Tc or $^{201}$Tl, the concentrations of the radiopharmaceuticals may vary widely. As non-limiting examples, $^{99m}$Tc-containing radiopharmaceutical may range in concentration from 1 mCi/ml to 150 mCi/ml, while pharmaceuticals containing $^{201}$Tl may range in concentration from 1 mCi/ml to 10 mCi/ml. The aperture wheel may be used to reduce the amount of radiation passing through the collimator to the detector to prevent saturation. The selectable aperture 90 allows the detector 30 to accommodate a large concentration range of the potential radiopharmaceuticals and so that the detector does not become saturated (high concentration level) or require an exceedingly long measurement time (low concentration level). FIG. 2 illustrates one embodiment of the selectable aperture 190.

An alternate embodiment to control incident radiation flux on the detector may rely on means to change the length of the optical path between the pharmaceutical in the interrogation region and the crystal detector. In this embodiment (not shown), the wheel comprising attenuation elements is replaced by a second telescoping collimator affixed to the detector on a movable gantry. The telescoping collimator abuts against the fixed collimator thereby forming a single, variable-length, collimation path. By moving the gantry, the user may shorten or lengthen the optical path from the interrogation region to the detector, thereby changing the amount of radiation incident on the detector according to well known optical principles.

A radiation detector 30 is located downstream from the container holder 20 the collimator 60, and optional aperture/attenuator 90. The radiation detector 30 may use a variety of modern radiation sensing technologies appropriate for the energy range of interest. Exemplary radiation sensing technologies include a Si PIN or avalanche photodiode array (silicon PMT) with a scintillating material, or cadmium-/zinc-/telluride (CZT) or cadmium/telluride (CT) crystal-based detectors. Such a sensor has the benefit of high sensitivity as well as small profile and low cost. A CZT sensor comprises a CZT crystal (the sensor) across which an electric potential is applied via an anode and cathode. Incident gamma or x-rays (ionizing photons or photons herein) create a pulse of electron-hole pairs which migrate to the anode and cathode respectively. The pulse of electrons travel much more quickly due to higher mobility and is collected at the anode typically through a blocking capacitor (which protects the charge amplifier from the high voltage bias present at the anode). The number of electron-hole pairs created is proportional to the energy of the photons absorbed by the crystal and provides a pulse of charge at the anode.

Detector 30 may further include amplifier 50 because current output of the crystal may require amplification for further use. A short time constant/high-bandwidth transimpedance amplifier, or an integrating amplifier are two non-limiting examples of such an amplifiers that may receive the current pulse produced by the crystal. The radiation detector 30, signal capture electronics 70, and microprocessor/DSP 80 are further illustrated in FIGS. 4*a-c*.

Figure 4A:
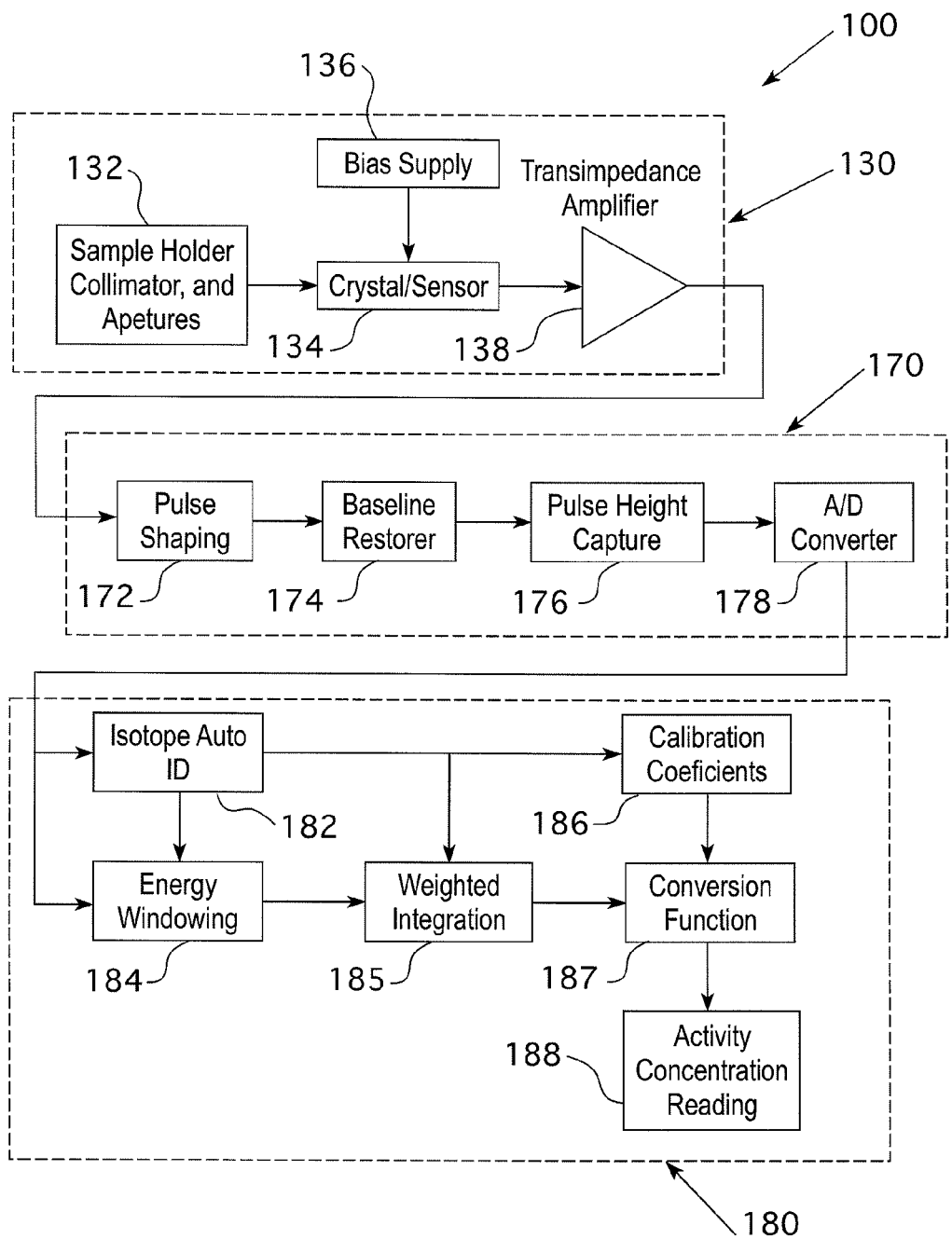
FIG. 4a illustrates a block diagram of one embodiment of the measurement system including a detector, electronic hardware component, and software processing modules based on a system incorporating a transimpedance amplifier.

The detector 30 produces an analog signal captured and digitized by the signal capture electronics. FIG. 4*a* illustrates detector 130 that may include a transimpedance amplifier. The detector output pulse may be further conditioned using hardware components before being digitized by the A/D converter in signal capture or pulse shaping and capture module 170. This process is further illustrated in FIG. 4*a*. As an alternative embodiment shown in FIG. 4*c*, the transimpedance amplifier output pulse may be captured by the A/D converter directly, with further signal conditioning provided by software modules in the DSP software. In another embodiment shown in FIG. 4*b*, the analog output of an integrating amplifier 238 may simply be digitized by an A/D converter 272 for further processing by the microprocessor/DSP system 280.

Figure 4B:
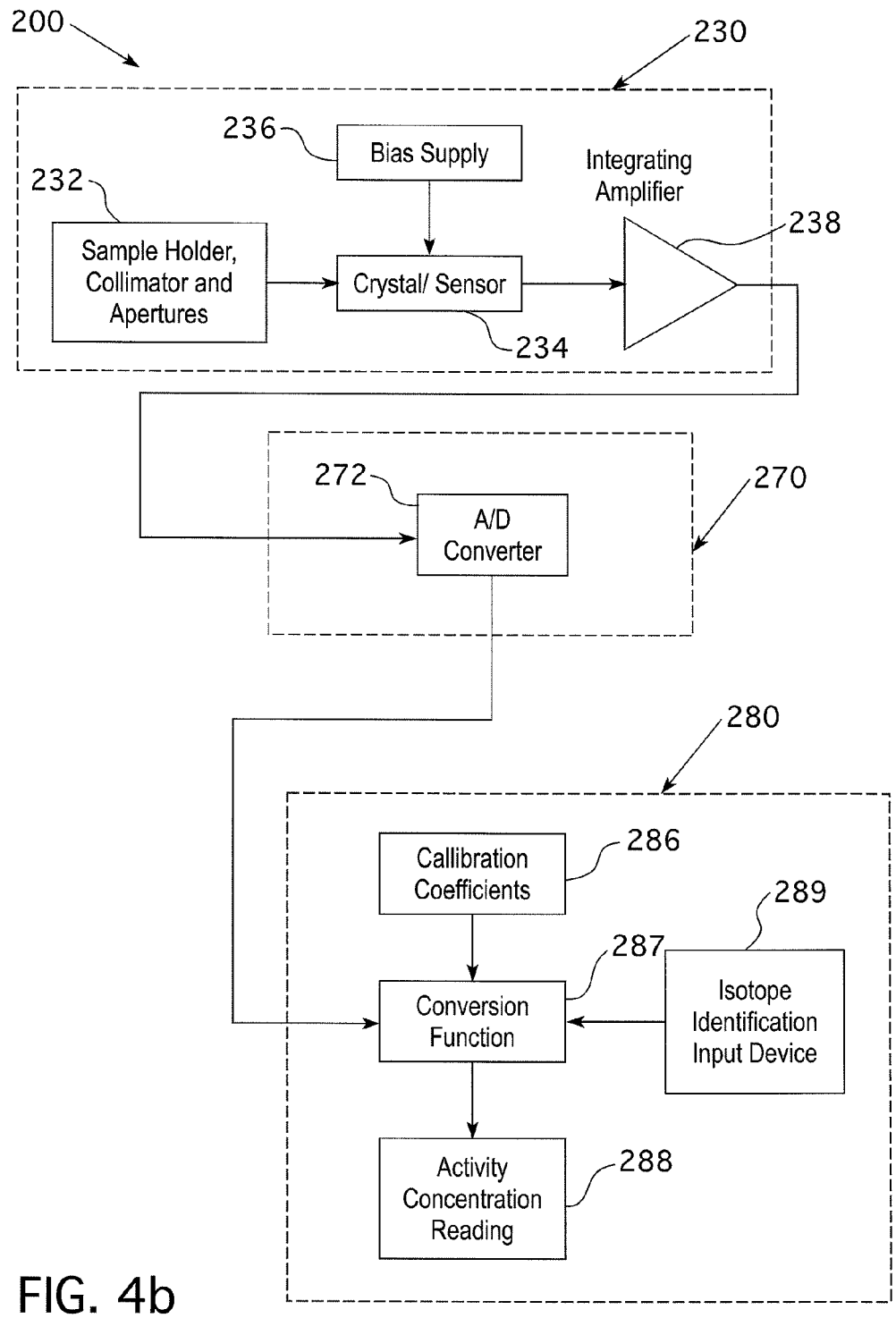
FIG. 4b illustrates a block diagram of another embodiment of the measurement system incorporating an integrating amplifier.
Figure 4C:
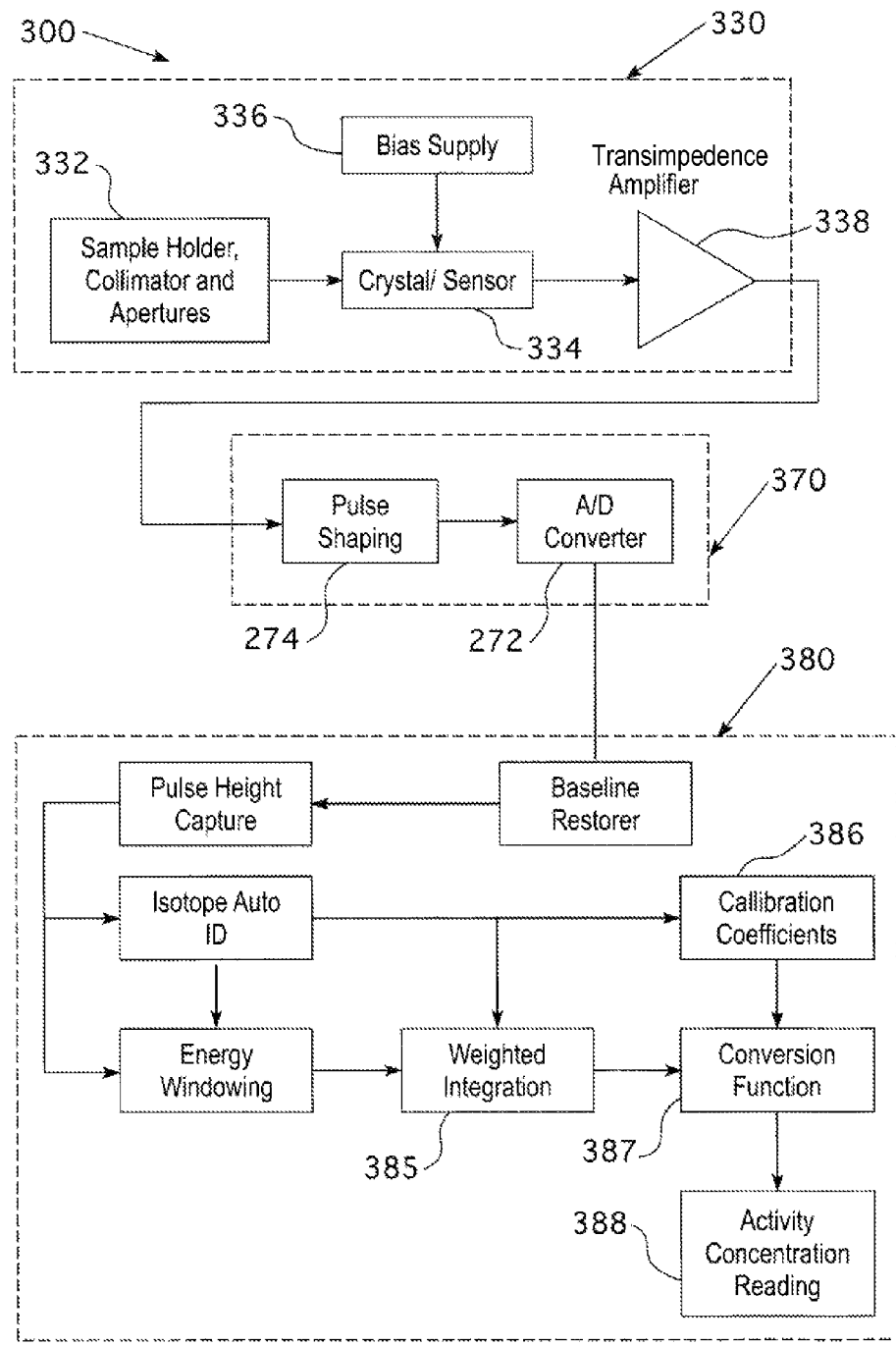
FIG. 4c illustrates a block diagram of yet another embodiment of the measurement incorporating a transimpedance amplifier, in which several hardware functions are incorporated into the software modules.

The digitized detector data output is then transmitted to microprocessor 180, 280, or 380 of the concentration detector system as shown in FIGS. 4*a-c*. The microprocessor may implement any number of digital signal processing (DSP) algorithms to analyze the data. Such algorithms may include, but are not limited to: algorithms to window a pulse shape to determine the photon energy associated with each pulse, histogram the energies associated with pulse data into a radiation spectrum, shape the energy spectrum to identify characteristic energy peaks, identify the nuclide based on the energy spectrum, calculate the specific activity of the sample of the radiopharmaceutical, and calculate the half-life of the radiopharmaceutical sample within the interrogation area.

FIG. 2 illustrates an alternate embodiment of the radiopharmaceutical concentration measurement system described in FIG. 1. FIG. 2 specifically illustrates a preferred embodiment comprising a syringe-type fluid container with plunger, a shielded fluid pathway for the radiopharmaceutical measured in the fluid container, a shielded fluid container holder with latching mechanism, an aperture wheel, and a radiation detector assembly. The radiation detector assembly may further comprise a sensor crystal, an amplifier, and pulse shaping and capture electronics (all not shown) located within an electrically shielded enclosure.

In the embodiment illustrated in FIG. 2, the fluid container comprises a syringe to hold the radiopharmaceutical during the measurement process. The syringe may be filled or emptied through the activation of the plunger located below the syringe. Such activation may be accomplished either manually or via a mechanical means under electronic or computer control (not shown).

Figure 3:
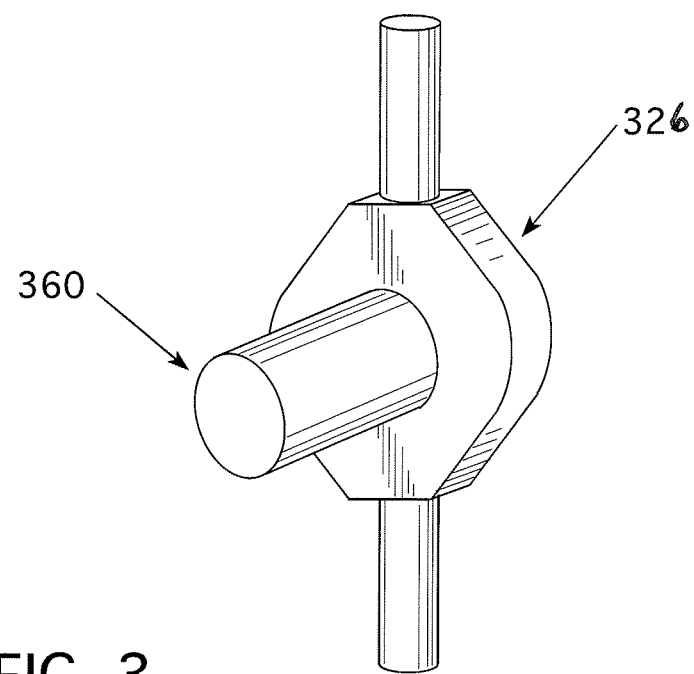
FIG. 3 illustrates an alternative embodiment of a collimator and container of the present invention.

FIG. 3 illustrates another embodiment of the fluid container 320. The radiopharmaceutical fluid may be delivered to the container opening by means of a valve mechanism to route the fluid into and then out from the fluid container. The fluid container 320 is octagonal covering the syringe.

The fluid container is located within a shielded fluid container holder. The fluid container holder is preferentially composed of tungsten or other high density material to minimize the amount of radiation emitted by the pharmaceutical into the environment. In FIG. 2, the shield includes a shielding block 191 that may slide over the fluid container and latched in place. The holder 120 assures that the fluid container 126 will be maintained at a fixed geometry with respect to the other optical components (collimator and optional apertures/attenuators), as well as with respect to the radiation sensor.

Adjacent to the fluid container 126 may be a collimator. In FIG. 2, the shielded container holder 120 may force the fluid container 126 to abut against the collimator or selectable aperture 190, assuring a fixed geometry of the fluid container and the collimator. For example, in the embodiment illustrated in FIG. 1*a*, the collimator 60 is interposed between the fluid container 20 and selectable aperture 90 wheel.

As shown in FIG. 2, the selectable aperture wheel 190 may comprise a variety of pucks or disks 190*a*, 190*b*, 190*c*. Each disk may be a different attenuating/shielding material chosen to be appropriate for the type of radionuclide injected into the patient. The attenuating/shielding material is selected to adjust the level of radiation so that detector 30 can properly determine the radioactivity. Two exemplary materials are lead and tungsten. Each disk may include pinhole(s) 195 or thin section(s) 197, either one providing an appropriate amount of attenuation. The pinholes may have differing diameters, while the thin sections may possess varying thicknesses, either configuration permitting greater or lesser amounts of radiation to impinge on the detector. With a variety of apertures, each specific aperture may be associated with a specific radionuclide, such as a 0.120 inch diameter aperture with a $^{201}$Tl-containing pharmaceutical.

The pinhole apertures may be fabricated as part of the aperture wheel, or individual removable disks may contain the aperture holes and be inserted into receiving wells in the wheel. The removable aperture disks may then be fixed in the wells using any number of means known to those skilled in the art, such as via the use of set screws. The use of removable aperture disks may find utility for a user of the concentration measurement system when a radiopharmaceutical with a concentration or radionuclide that differs from those used previously must be employed in a procedure. In such an example, a different set of apertures may be required to attenuate the radiation impinging on the sensor than apertures for different radionuclide. The aperture wheel may be moved manually by an operator or via a motorized system under control of the microprocessor. In either embodiment, the aperture wheel may be temporarily fixed in a specified orientation to assure the aperture pin hole aligns with the collimator. In the embodiment illustrated in FIG. 2, detents in the edge of the aperture wheel may mate with a spring-loaded ball to assure the wheel alignment is correct.

The aperture wheel or selectable aperture may also include a known radioactive check source to verify the proper functioning of the sensor and the associated electronics, such as $^{241}$Am. The check source may be used, for example, when the concentration sensor is first powered up in order to verify that the detector and electronics operate consistently on a daily basis. Alternative radiation sources may be employed by a user, or the user of the measurement system may not wish to have any active radiation source on the aperture wheel. Such calibration sources may also be fashioned as disks similar to removable aperture disks, which may be introduced into, or removed from, the wells in the aperture wheel. Alternatively, other optical attenuation elements may be used instead of apertures such as attenuation foils or thin sheets of materials composed of, lead, tungsten or other attenuating material.

The radiation emitted by the pharmaceutical in the interrogation area, which passes through the collimator and aperture, is thereafter detected by a radiation detector. As exemplified in FIG. 1a, a CZT detector with amplifying electronics may be used as such a detector. Such a CZT detector can be housed in an assembly as small as a 20 mm cube, and may be attached to a small circuit-board containing conditioning electronics to provide the required data for a computer to acquire and use (see for example the eV Microelectronics iGEM Sensor Module [http://www.evmicroelectronics.com/igemsm.html viewed 13 Nov. 2009]). As illustrated in FIG. 2, such a radiation detector may be housed within an enclosure 130a with electrical shielding to reduce the amount of ambient electronic noise picked up by the detector electronics.

FIG. 3 illustrates another embodiment of the radiopharmaceutical fluid container 326. In this figure, the container is not fabricated as a cylindrical syringe, but rather has a pair of parallel flattened surfaces, front and rear, with a rectangular cross section. This fluid container may be fabricated as an injection moldable part that is inserted in-line with fluid delivery tubing by which the radiopharmaceutical may be delivered to the fluid container. This "pancake" style chamber flares out to provide the additional fluid margin around the interrogation region and has a flat front face. An important dimension for the flared pancake sample chamber, that can impact the measurement accuracy, is the thickness/depth (along the long axis of the collimator 360) of the fluid chamber. With the flared fluid chamber embodiment, one advantage is that the flat front face can be easily mated with the collimator while fixing the detector-source (fluid) distance. Furthermore, the criticality of lateral alignment between the collimator 360 and chamber is thereby reduced.

FIGS. 4a-c illustrate embodiments of expanded block diagrams of the concentration measurement system as illustrated in FIG. 1. In the embodiment illustrated in FIG. 4a included are a detector 130, pulse shaping and captive module 170 and microprocessor 180. Detector 130 includes a transimpedance amplifier 138 and pulse-shaping/capture electronics that creates conditioned pulses digitized for processing by the software modules implemented in the Microprocessor/DSP section. The embodiment illustrated in FIG. 4b employs an integrating amplifier 238 that provides a voltage output to pulse/capture module 270 and then provided to the Microprocessor/DSP module 280. The embodiment illustrated in FIG. 4c also employs an transimpedance amplifier in the detector, but the output pulse is only shaped before being digitized in its entirety for further information processing in the Microprocessor/DSP.

As illustrated in FIG. 4a, the detector 130 comprises, without limitation, the detector mechanics previously described in FIG. 1 (the fluid holder, fluid holder shield, or other appropriate crystal detector collimator, and apertures), the radiation detector sensor (such as a CZT crystal detector) along with its high voltage bias supply, and the amplifier that amplifies the detector output signal. In FIG. 4a, the detector amplifier is a transimpedance amplifier. The transimpedance amplifier is commonly used in counting applications and when spectra are being collected. Such counting applications may include determining the number of pulses received in a specified time period, or determining the amount of time required to collect a specific number of pulses, for example a large number of pulses, at least several thousands (e.g. 40,000) may be counted to improve the counting statistics. The height of the voltage pulse is proportional to the amount of charge collected which is, in turn, proportional to the energy of the incoming photon.

Pulse shaping and capture module 170 illustrated in FIG. 4a receives the signal output pulse from the radiation detector 130. The hardware components of pulse shaping and capture electronics 170, without limitation, electronic circuits for pulse shaping 172, baseline restorer 174, pulse height capture module 176 and A/D converter 178 that condition the voltage pulses output by the transimpedance amplifier. The pulse shaping module 172 extracts just the transient voltage signal of interest that represents the photon event to be counted from the detector output. These electronics may comprise, but are not limited to, a series of active and/or passive electrical filters. The baseline restorer module 174 serves to normalize the pulse baseline, and correct for baseline drift due to pulse pile-up in the detector. Pulse pile-up may occur if a sufficient number of photons absorbed by the detector crystal results in voltage pulses with a frequency greater than the detector amplifier can resolve. The high frequency in pulses results in pulse overlap, which produces an apparent voltage drift in the pulse baseline as well as pulse shape distortion.

The conditioned electrical pulses may then be captured by electronics, such as a sample-and-hold amplifier which presents a stabilized voltage to an analog-to-digital (A/D) converter. The pulses are typically 0.5 to several microseconds in width. Therefore a peak detection circuit with a suitable response time (less than 0.5 to several microseconds, correspondingly) for capturing the pulse height information is required. For pulse height discrimination, an A/D with a suitable number of bits is required. As an example, for the discrimination between $^{99m}$Tc and $^{201}$Tl an 8 bit ND would be suitable. Although the exact trigger/arrival time for each pulse would provide additional statistical information to confirm the existence of an exponential distribution for the time periods between the pulses, this information is not required to calculate the photon count rate. This will hold true as long as the system can measure the total number of pulses acquired in an accurately measured time period. The time period should be measured to 0.5% or better accuracy, for example, if one is attempting to measure the source concentration to 3% accuracy. Sufficient accuracy in time measurement may be provided by a clock circuit, typically part of the microprocessor/DSP board.

Figure 5A:
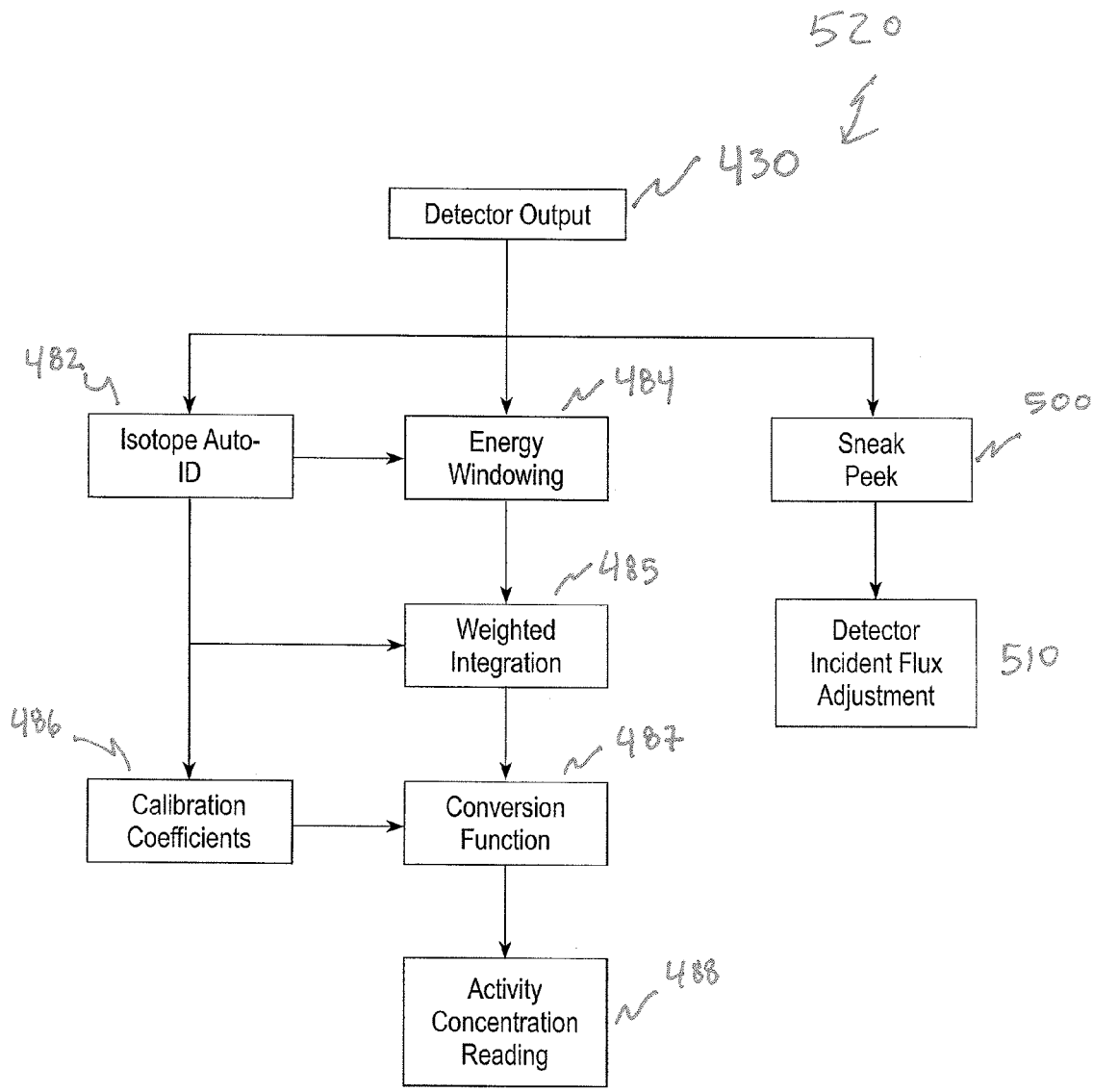
FIG. 5a illustrates a block diagram of one embodiment of the measurement system software processing module.
Figure 5B:
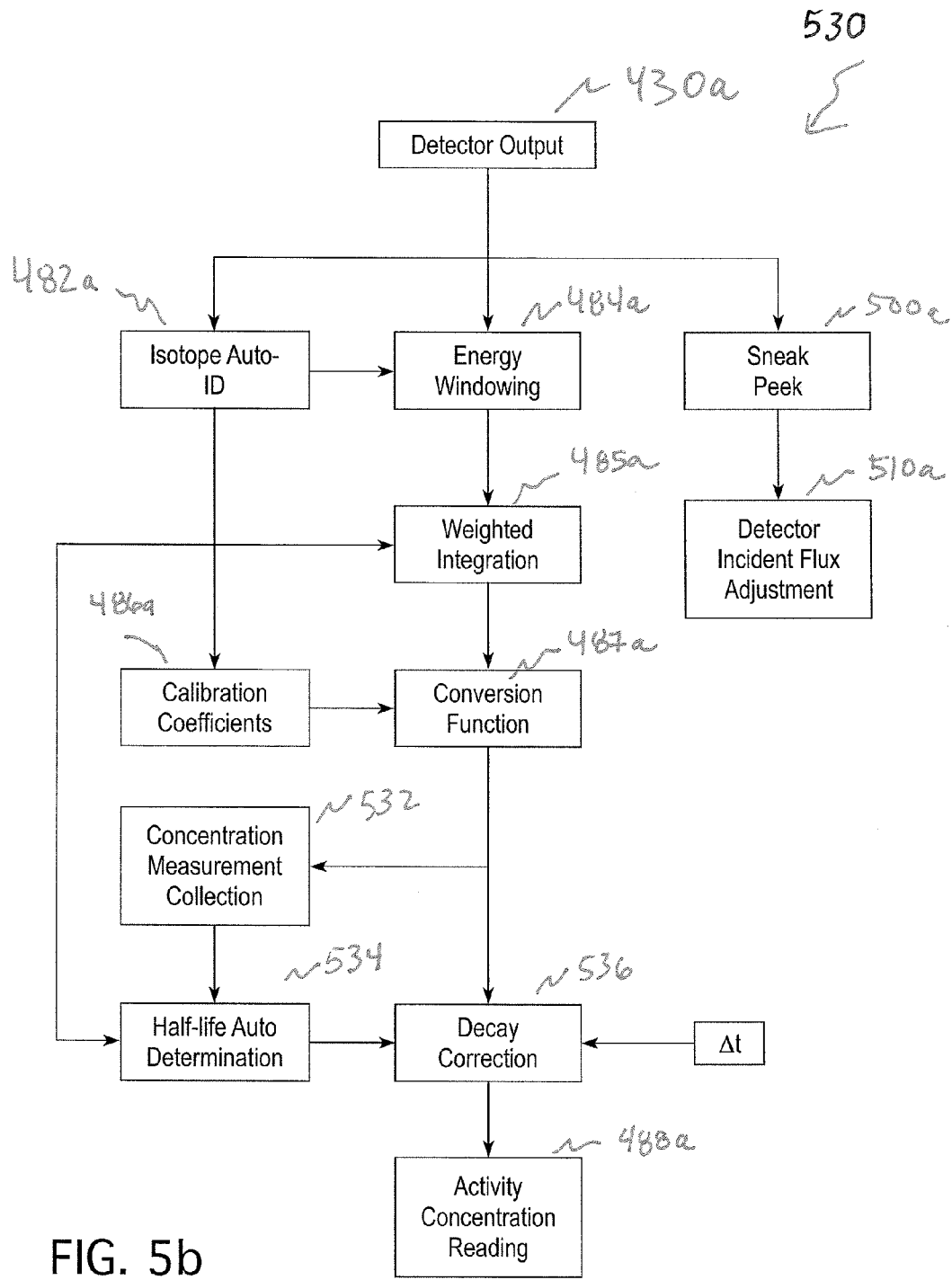
FIG. 5b illustrates a block diagram of another embodiment of the measurement system software processing module, including modules for calculating the effective decay half-life of the radionuclide.

The Microprocessor/DSP 180 in FIG. 4a is described in more detail in FIGS. 5a and 5b. FIG. 5a illustrates the basic and non-limiting software components used for a radiopharmaceutical for which the half-life of the radionuclide is well characterized (such as but not limited to $^{201}$Tl). FIG. 5b illustrates additional modules that may be used to calculate the half-life of a radiopharmaceutical in which the radionuclide is contaminated by other radioactive species (such as $^{99}$Mo contaminants in $^{99m}$Tc). Components of this block may include, but are not limited to, an isotope auto identification function 482, an energy windowing function 484, a weighted integration function 485, a calibration function with calibration coefficients, a function to convert pulse voltage amplitudes to decay energy, and a function to calculate the pharmaceutical concentration level.

FIG. 4b illustrates an alternate embodiment of the measurement system including detector 230, signal capture hardware 270 and microprocessor 280. Detector 230 includes an integrating amplifier 238 instead of a transimpedance amplifier as shown in FIG. 4a. The integrating amplifier will produce a voltage that is proportional to the current produced in the crystal caused by the radiation flux striking the detector. This current will then be proportional to the rate at which photons are being absorbed in the crystal which directly correlates to the activity of the radiation source of interest. Unlike the alternate embodiments utilizing the transimpedance amplifier in the embodiment in FIG. 4a, the embodiment having the integrating amplifier will not allow pulse height analysis (histogram to form an energy spectrum), and therefore automatic isotope identification will not be possible, as it is with the transimpedance amplifier embodiment.

The signal capture hardware illustrated in FIG. 4b uses digitizing hardware components, such as, but not limited to, an A/D converter 272. As noted previously, integrating amplifier 238 used in detector 230 does not produce pulses associated with each photon capture event, but rather integrates the sensor output pulses to provide a voltage level. Consequently, this voltage only needs to be digitized for Microprocessor 280 that receives this digitized information.

The Microprocessor 280 in FIG. 4b, does not include the auto-isotope identifier illustrated in microprocessor 180 of FIG. 4a. Since the pulse information is not presented to the microprocessor DSP, auto-isotope identification is not possible. Consequently, identification of the radionuclide or radiopharmaceutical needs to be provided to the microprocessor. Such isotope identification module 289 may be provided by the user directly through an input device 289 such as a keyboard, or the information may be supplied, in a non-limiting example, an electronic input, such as bar code, RFID or any other reader or electronic informatics input device associated with the system to read the information from a container of the radiopharmaceutical or retrieve from a location associated with the container. Once this information is provided, the proper calibration coefficients may be determined and the integrated voltage data may be converted into the proper information from which the specific activity may be calculated.

Another alternate embodiment of measurement system 300 illustrated in FIG. 4c employs transimpedance amplifier 338 in the detector 330 similar to that in FIG. 4a. However, the Pulse Shaping and Capture Hardware 370 comprises the pulse shaping 274 and digitizing 272 hardware. In FIG. 4c, the baseline restoration and pulse height capture functions, provided as hardware embodiments in FIG. 4a, are replaced by software modules incorporated in the Microprocessor/DSP 380. In FIG. 4c, the digitization hardware comprises a high speed A/D circuit 272. The sampling rate, as a non-limiting example of, 20-200 MHz would be a value so that a sufficient number of data points are collected across a 0.5 microsecond to several microsecond pulse so that the pulse height can be accurately measured (for isotope discrimination purposes). The high speed A/D could be triggered so that it only samples each time a new pulse arrives or it could be continuous (if a large amount of memory is available). Digitizing circuits increase in cost as sampling rate increases.

In FIG. 4a, the hardware pulse shaping and capture module 170 includes a hardware pulse capture circuit 176 (e.g. peak conditioner hardware with sample and hold circuit) used to capture and store the pulse height information long enough for a lower speed A/D converter to sample and store the pulse height information. The reduced sampling rate could be on the order of 2 MHz (significantly lower, and hence less expensive, than the high-rate sampling of 20-200 MHz required to digitize an entire pulse) and would be asynchronous since the photon events are random in nature. However, changes to the baseline restoration and pulse height capture functions can be more readily made if incorporated into the software functions in the Microprocessor/DSP 380 as illustrated in the embodiment of FIG. 4c, than if realized as hardware components, as in FIG. 4a. Further, the software realization of the functions can reduce the amount of circuit board real-estate and component cost required for the extra hardware components in the embodiment illustrated of FIG. 4a.

The embodiment illustrated in the microprocessor/DSP 380 of FIG. 4c is similar to that illustrated in FIG. 4a, except that the baseline restorer and pulse height capture functions, implemented in hardware in FIG. 4a, are realized as software modules in FIG. 4c. Otherwise, microprocessor/DSP 380 is similar to that of the microprocessor/DSP in FIG. 4a, and is described in more detail in FIGS. 5a and 5b.

FIGS. 5a and 5b present block diagram illustrating the modules 520, 530 of the microprocessor/DSP board. These modules provide processes that are included in the microprocessor/DSP 180 of FIG. 4a, as well as the microprocessor/DSP 380 of FIG. 4c after the software baseline restorer and pulse height capture processes. The microprocessor includes, without limitation, an isotope auto-identification process 482, 482a, an energy windowing process 484, 484a, a process to adjust the incident radiation flux on the detector, a nonlinear correction/calibration process, and a process to convert the count data into a concentration measurement. Thus, conversion and concentration reading processes are implemented in the embodiment illustrated in FIG. 5a. FIG. 5b further incorporates an optional half-life measurement module for processes incorporating an activity measurement collection and half-life auto calculation.

Sensor output is important to effective concentration reading. Since the accuracy of the sensor output data is critical to the algorithmic processes, the sensor must operate in its linear response range. If the sensor is saturated, pulse-pile-up may result in inaccurate counting statistics and the pulse amplitudes may be distorted. Alternatively, if the sensor receives too few photons, the sensor output may reflect mostly sensor background processes and not the photon capture events. The sensor operation in the linear response range can be achieved by utilizing an optical element such as a pinhole or attenuator, or by varying the distance between the detector and the sample emitting the radiation.

In one embodiment, the user of the concentration sensor system may enter information about the radiopharmaceutical into an on-board computer via a keyboard, a touch sensor screen, or other input device known to those familiar with the art. In an alternative embodiment, the user may select one of several named drugs or radioisotopes from a list provided in a menu of choices by the computer. Alternatively, an isotope auto-identification process may be used to characterize the radionuclide in the sample. The computer may be previously programmed to select an optical element or a sample/detector distance based on the type of radiopharmaceutical thus identified. In an alternative embodiment, the flux incident on the detector can be adjusted via a "sneak peek" module. This module performs a process in which a small sampling of sensor output data may be used to automatically select an optical element from an optical element array, or adjust the distance between the sample and the detector by actuating a motor to move the detector and other optical elements (such as a telescoping collimator) either towards or away from the sample.

Figure 6:
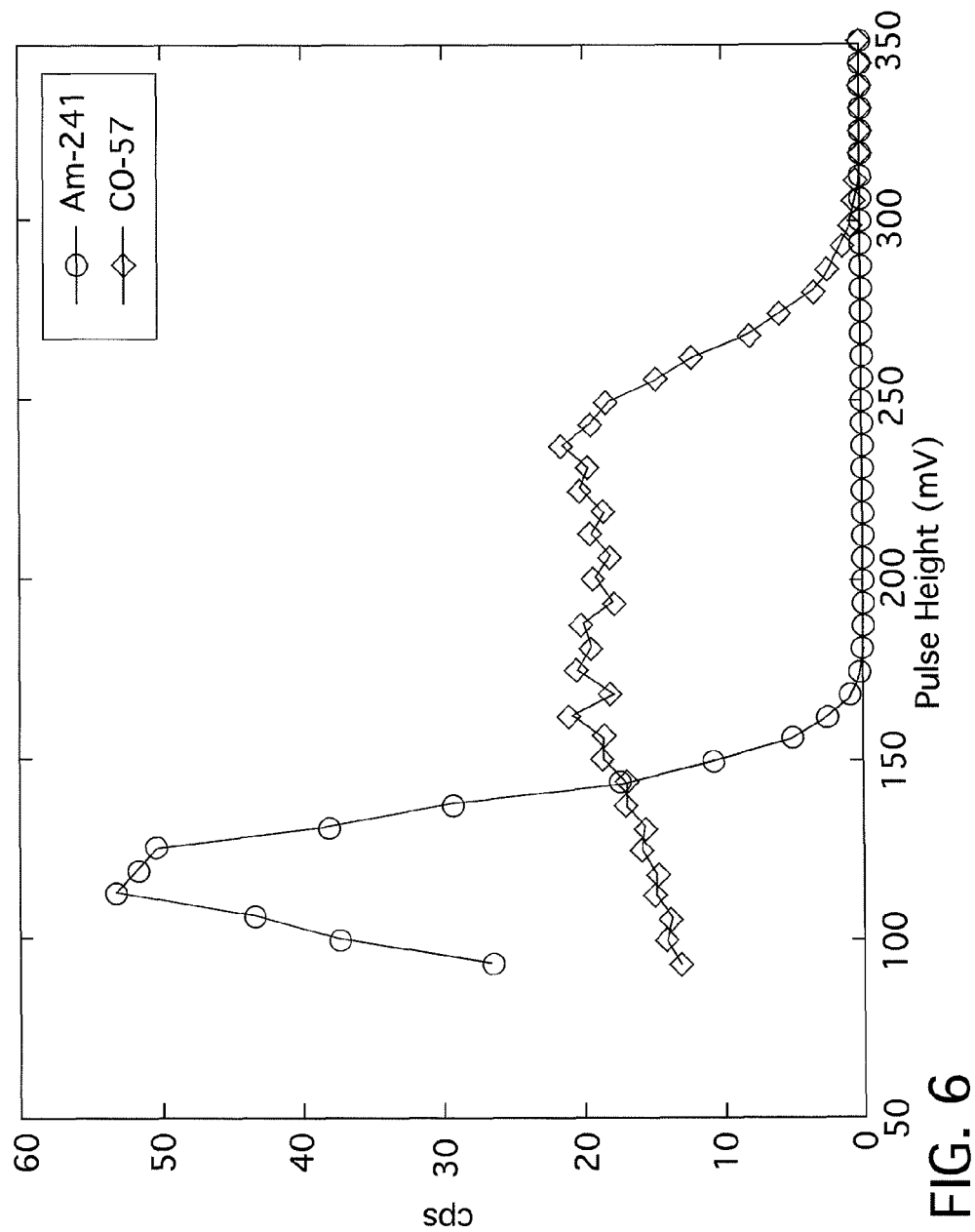
FIG. 6 illustrates the radiation emission spectra of two radio isotopes.

Isotope auto-identification is based on each radioisotope having its own unique spectral signature. Often there is a predominant energy resulting in more countable events in one region of the spectra than in others. Measuring the spectral signature of a radionuclide can be accomplished by capturing a large number of sensor output pulses, and forming a histogram by counting the number of pulses having maximal voltage values that lie within one of a plurality of narrow window of values. In one non-limiting example, the spectra for two radioisotope check sources, $^{241}$Am and $^{57}$Co, are illustrated in FIG. 6.

Radioisotope identification based on the spectral information can be performed several ways. Edge detection can be used to look for a negative going trend in the spectroscopic data across a narrow pulse height range, a non-limiting example being 25 mV. This edge detection locates the edge of the high energy peak in the radiation spectrum that can be specific for a particular radionuclide. For example, in FIG. 6, the $^{241}$Am spectrum shows a sharp decrease in spectral count rate between 125 and 150 mV, while the $^{57}$Co spectrum has a more gradual decrease between 250 and 300 mV. Another radioisotope identification technique uses a linear weighting approach. This approach uses a set of coefficients multiplied by the magnitude of the values in the spectrum histogram and subsequently summed to result in a unique value for each isotope of interest. Radioisotope identification preferably can be performed using a ratio of one or more of the count rate (cps) values averaged near pulse-height values diagnostic for each of several radionuclides, the ratios being diagnostic of the radionuclides normally used by the injection system. As an example of using ratios, as illustrated in FIG. 6, if $^{57}$Co and $^{241}$Am were the only radionuclides to be used in the injector, then the ratio of the count rate at 120 mV to a count rate near 200 mV can discriminate between $^{241}$Am (with a ratio >>1) and $^{57}$Co (with a ratio <1). Once the radionuclide type is identified, then that information can be used in half-life auto determination, energy windowing, calibration coefficient choice, and nonlinear correction/calibration steps.

Energy windowing comprises identifying a range of energies of interest, for example those most relevant to the peak energy of the data acquired by the sensor. For example with reference to FIG. 6, the sensor data for $^{241}$Am may be restricted to those in the range of energies between 75 mV and 150 mV. This windowing function can then pass the data in this energy range of interest to the weighted integration function.

The weighted integration function is one that will integrate the data within the specified window of energies and calculate the total energy associated with the radionuclide. One non-limiting weighted integration function may be a boxcar weighting pattern (in which all data within the window are weighted equally). Other weighed integration functions may include, but are not limited to, functions that reduce the contribution of lower energy values with respect to those of higher energy values. An example of a radionuclide for which such a non-uniform weighting function may be appropriate is the $^{57}$Co spectrum in FIG. 6. The $^{57}$Co spectrum demonstrates a long roll-off in energies below 250 mV, which may incorporate the Compton scatter continuum. A complex weighting function may be used to shape the low-energy data to provide better 250 mV peak resolution.

Once energy windowing is completed and radionuclide peak energy data are integrated, the count data are converted into a concentration. The energy conversion function is one that relates the sample concentration to the photon count rate (measured by the detector, circuits, and microprocessor as described above). Some level of nonlinearity may be present in the windowed and integrated sensor data because pulses are missed due to their close proximity to other pulses. All counting systems have a 'dead time' or reset time in which they cannot detect a new pulse. This "dead time" may occur in the analog sensor signal processing stage due to the response times of the analog circuit elements. Similarly, the pulses may be missed if they occur faster than the ADC digitization step. These both may result in nonlinearity in the count rate error as the count rate increases.

One solution to reducing the problem of missed counts is to reduce the amount of radiation incident on the detector so that the detector and the capture electronics operate in their linear range. The reduction in this incident radiation can be accomplished by selecting an appropriate attenuator or other optical element between the interrogation volume and the detector to reduce the incident flux.

Alternatively, another correction to missed counts includes a software algorithm based on the use of a lookup table with interpolation after the energy integration step. This would involve creating a look-up table having a series of paired numbers where each pair would represent the actual source concentration value and the corresponding count rate. This information could be derived empirically from a calibration process using a known standard radiation source. For the calibration process, the concentration of each radionuclide sample would be determined by measuring the activity of a sample of the radionuclide in a dose calibrator, measuring the volume of the sample, and dividing the two values. A look-up table can be constructed using a series of samples of the measured standard across a variety of known concentrations over the concentration range of interest. The look-up table values can be used by comparing the count rate of a radiopharmaceutical sample against the table, and using a standard interpolation method (linear, polynomial, spline, etc.) for sample values falling between two points in the table. This look-up table method may also be used if no non-linear corrections are required.

In an alternative embodiment, a Lambert-W type model initially fit to calibration data for a particular radionuclide can be used to minimize the missed count errors and would provide a final concentration measurement with inherent nonlinearity corrections included. For example, a first-order Lambert-W type function may be constructed as:

$$C = Z_0 * \left(\frac{S}{A_0}\right) e^{\left(\frac{S}{A_0}\right)}$$

where C is the pharmaceutical concentration, S is the sensor count rate, and the coefficients $A_0$ and $Z_0$ are radiopharmaceutical dependant dependent. For example, for a radiopharmaceutical comprising $^{201}$Tl, the coefficients would be:
$A_0=1.19*10^7$ Counts/Second
$Z_0=1.55*10^4$ mCi/mL
and a pharmaceutical comprising $^{99}$Tc the coefficients would be:
$A_0=5.37*10^5$ Counts/Second
$Z_0=1.40*10^4$ mCi/mL.

The results of the nonlinearity correction and calibration process, combined with the known geometry and volume of interrogation region of the fluid container, provides the concentration or activity measurement of the bulk radiopharmaceutical solution at the time the measurement was made.

Once the conversion process calculates the concentration activity measurement, the Activity Concentration Reading function provides this information to the injector system (not shown) or any part of a system requiring the concentration measurement data. The concentration measurement may be logged as part of patient records, or used by the injector as a means to calculate doses delivered to the patient after the concentration measurement has been made. These calculations, as known to those familiar with the art, may be based on the concentration measurement, the time when the concentration measurement was made, the time when a subsequent dose will be delivered, and the half-life of the radionuclide present in the radiopharmaceutical (either from information stored in a database, or measured by the sensor).

Typically, the bulk concentration measurement is not performed for every injection of the radiopharmaceutical into the patient. Instead, such a measurement may be made intermittently throughout a day during which several patients may receive injections. The patient dose may not always be determined based on a contemporaneous concentration measurement of the bulk radiopharmaceutical. In such cases, the patient dose is extrapolated from the last known concentration measurement, based on the radionuclide half-life, last concentration measurement, and the time elapsed between the measurement and the injection.

For some radiopharmaceuticals, such as those containing $^{201}$Tl only a single species of gamma-emitting radionuclide is present. In such instances, the known literature value of the half-life may be stored in a database in the injector computer and used directly to calculate the patient dose. However, $^{99m}$Tc is produced from a generator which may permit $^{99}$Mo contaminants to be incorporated into the radiopharmaceutical. Since the half-life of $^{99m}$Tc is short compared with $^{99}$Mo (6 hours versus 66 hours), the nominal half-life of $^{99m}$Tc cannot be used to calculate a patient dose since it will under-estimate the amount of $^{99m}$Tc that has decayed in the time between the concentration calculation and the infusion of a patient with the pharmaceutical. Therefore, it may be necessary measure the effective half-life of the bulk $^{99m}$Tc-containing radiopharmaceutical, or other radiopharmaceuticals susceptible to similar impurities. These steps are illustrated in the flow chart presented in FIG. 5b comprising additional steps to those described for the flow chart illustrated in FIG. 5a.

FIG. 5b illustrates the additional modules or processes required to calculate the effective half-life of the radiopharmaceutical after enough time has passed with respect to the half-life of the isotope being measured. The effective half-life may be calculated by measuring the activity ($C_0$) of a known volume of a radionuclide at a initial time point ($t_0$) and then making at least one more such measurement (C(t)) at an additional time point in the future (t). The half life can then be calculated based on the equation:

$$C(t) = C_0(R, E_{type}) \cdot 0.5^{\frac{t}{T_h}}$$

in which $T_h$ is the effective half-life. Sequential measurements of the activity of the radiopharmaceutical in the interrogation region with their time stamps may be acquired by the activity measurement collection module or process 532. The set of such acquired measurements and corresponding time data may then be used by the half-life auto determination 534 module or process to calculate the effective half-life according to the equation above. The effective half-life may then be used to calculate the patient doses instead of stored literature values. The radionuclide determined through the isotope auto-ID 234 module or process may determine if the literature half-life value or the half-life auto determination value will be used by the dose calculation process.

If the half-life of the contaminant is long compared to that of the expected radionuclide, the amount of time required to sample the activity for an accurate calculation of the effective half-life may be significantly larger compared with the time required to deliver a dose to patients. Therefore, there would be a significant impact on ability to examine a number of patients per day if a long duration is required to determine the effect half-life before the start of patient dosing. Therefore, the effective half-life measurement may be a concurrent process while the injector is used for the diagnostic procedures. Accordingly, the interrogation volume preferably will be small with respect to the total volume of the fluid chamber, which may range between 0.25 and 1.0 mL. In such an instance, the fluid chamber may source small volumes of the radiopharmaceutical for patient diagnosis, while retaining sufficient fluid in the interrogation region to permit ongoing activity measurements.

FIG. 6 illustrates a comparison of two gamma radiation spectra, one for $^{241}$Am and one for $^{57}$Co. Such a graph may be generated from a histogram of the values of voltage pulse heights collected over time from a detector sensing a radioactive sample. The ordinate of the figure represents photon counts per second at specific pulse height values and the abscissa represents the value of the pulse heights (in mV). The pulse heights are the output values by the pulse shaping and capture electronics, and are not reported as equivalent gamma photon energies. If the detector and its electronics are calibrated against a known radiation source (such as $^{241}$Am), the reported pulse heights can be converted into gamma photon energies.

Figure 7:
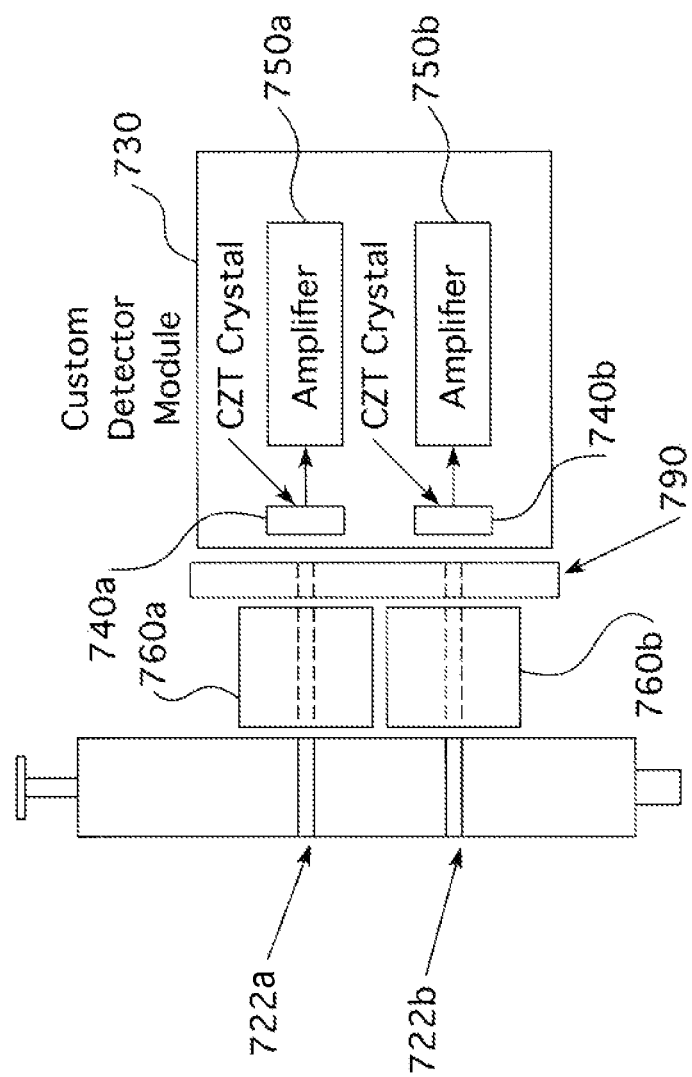
FIG. 7 illustrates a block diagram another embodiment of the concentration measurement system detector system demonstrating the use of a plurality of interrogation regions and radiation detectors.

FIG. 7 illustrates an alternative embodiment of the system detector 730. The system detector exemplifies a dual crystal sensor embodiment in which a pair of radiation sensors (such as CZT crystal detectors 740a, 740b and associated amplifiers 750a, 750b) detect the radiation emitted by the radiopharmaceutical located in two separate interrogation regions 722a, 722b. It should be appreciated that two or more radiation sensors may be used as well. The outputs of each detector may, for example, be routed through separate hardware pulse shaping and capture electronics, as illustrated in FIG. 4a-c, in which the digital outputs of the A\D converters are multiplexed for input into the microprocessor/DSP system. Alternatively, a microprocessor/DSP system with multiple digital input lines may be used, in which embodiment the system is programmed to accept the digital inputs from either of the separate detectors. In another embodiment, the outputs of each detector may be routed through separate pulse shaping electronics, the resulting signals used as inputs into a multi-channel A/D converter that can interleave conversions from each of the two detectors into the microprocessor over a single digital output.

As illustrated in FIG. 1, a collimator is placed next to the fluid container to define the optical region for radiation detection. In FIG. 7, a pair of collimators 760a, 760b is used, each directed towards a separate interrogation region. These collimators may have identical pin-hole dimensions. Alternatively, one collimator may have a larger pinhole diameter than the other. If the down-stream sensors have equal sensitivity to incident radiation, then this arrangement may assure that at least one of the sensors will operate in its linear range over a wide range of fluid concentration activity if the other sensor is either saturated or operating with minimal photon flux. Fixed apertures may be placed adjacent to the collimators, and in front of the crystal sensor of the detectors. These apertures may comprise, but are not limited to, pinholes, slits, or attenuation foils of various thicknesses as described above. As noted for the collimators, the width, dimensions, or thicknesses of the two apertures need not be identical. Thus, if the two collimators have identical dimensions, and therefore pass the same flux of photons from the radiopharmaceutical, the two crystal sensors may receive different photon fluxes if their respective apertures differ in their characteristics.

While embodiments of a system for measuring radioactive concentration, desirably provided as used with a syringe, pump of fluid path element in a delivery system, and associated with various fluid delivery devices or configurations for a fluid delivery system, and methods of use and operation thereof were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A system for measuring a radioactive concentration of a radiopharmaceutical, comprising:
   a container;
   an interrogation region associated with the container;
   a radiation detector to focus radiation emitted from the interrogation region;
   a signal capture device capable of obtaining a radiation measurement of the radiation emitted from the interrogation region; and
   a microprocessor system in data communication with the signal capture device; and
   an aperture system having at least one optical element disposed between the interrogation region and the radiation detector,
   wherein the microprocessor system is capable of calculating a radioactive concentration of a radiopharmaceutical contained in the interrogation region from the radiation measurement of the radiation emitted from the interrogation region obtained by the signal capture device, and
   wherein the aperture system controls a selection of the at least one optical element based on a concentration of the radiopharmaceutical or a type of a radioactive nuclide in the interrogation region.

2. The system of claim 1 wherein the microprocessor system is capable of calculating an identity of a radioactive nuclide associated with the radiopharmaceutical contained in the interrogation region from the radiation measurement of the radiation emitted from the interrogation region obtained by the signal capture device.

3. The system of claim 1, further comprising a collimator disposed adjacent to the aperture system.

4. The system of claim 1, wherein the at least one optical element is selected from apertures or attenuating materials.

5. The system of claim 3, further comprising a motorized system in mechanical communication with the aperture system, wherein the motorized system is capable of moving the aperture system so that the at least one optical element is positioned between the collimator and the radiation detector.

6. The system of claim 1, wherein the radiation detector includes a crystal sized to an exposed area of the interrogation region and thereby focused to detect the radiation emitted from the interrogation region.

7. The system of claim 1, further comprising a collimator disposed between the container and the radiation detector, wherein the collimator focuses the radiation detector on the interrogation region.

8. The system of claim 1, wherein the signal capture device includes at least a means for converting an analog electrical signal into a digital representation thereof, wherein the digital representation is being presented on a signal capture device digital output.

9. The system of claim 1, wherein the radiation detector further comprises a crystal radiation sensor and an amplifier,
   wherein the amplifier receives data from the crystal radiation sensor.

10. The system of claim 1, further comprising
    at least a second radiation detector comprising at least an output,
    wherein the container further comprises at least a second interrogation region from which the at least the second radiation detector detects emitted radiation.

11. The system of claim 1, wherein the microprocessor system is further capable of calculating a half-life of the radiopharmaceutical contained in the interrogation region from a signal capture digital output.

12. The system of claim 1, wherein the container is a syringe or a pump.

13. A method for measuring a radioactive concentration of a radiopharmaceutical in a concentration measuring system comprising a container including at least one interrogation region, a radiation detector having at least an output, wherein the radiation detector detects a radiation emitted from the at least one interrogation region, a signal capture device including an electronics input and a digital output, the electronics input being in electrical communication with the at least the output of the radiation detector, a microprocessor system in data communication with the digital output of the signal capture device, and an aperture system having at least one optical element disposed between the at least one interrogation region and the radiation detector, wherein the aperture system controls a selection of the at least one optical element based on a concentration of the radiopharmaceutical or a type of a radioactive nuclide in the interrogation region, the method comprising:

exposing the radiation detector to radiation emitted by the radiopharmaceutical contained in the at least one interrogation region;

capturing a signal from the output of the radiation detector through the electronics input of the signal capture device;

converting the signal captured from the output of the radiation detector into a digital representation thereof;

communicating the digital representation from the digital output of the signal capture device to the microprocessor system;

analyzing the digital representation using at least one software module resident on the microprocessor system to provide at least one analysis thereof; and calculating the radioactive concentration based on a total radiation value calculated by the at least one analysis.

14. The method of claim 13, wherein the step of analyzing the digital representation further comprises the steps of:

calculating a histogram comprising a plurality of energy values and a plurality of numbers of occurrences of each of the plurality of energy values from a plurality of digital representations;

windowing the histogram into at least one energy value and at least one of the plurality of numbers of occurrences of the at least one energy value thereby creating a windowed histogram;

integrating the at least one of the plurality of numbers of occurrences of the at least one energy value in the windowed histogram thereby creating an integrated value; and converting the integrated value into the total radiation value.

15. The method of claim 14, wherein the integrated value is further corrected for non-linearity in the digital representation.

16. The method of claim 13, wherein the at least one software module comprises a plurality of software modules.

* * * * *

UNITED STATES PATENT AND TRADEMARK OFFICE
CERTIFICATE OF CORRECTION

PATENT NO. : 9,715,020 B2  
APPLICATION NO. : 13/639623  
DATED : July 25, 2017  
INVENTOR(S) : Mabie et al.

Page 1 of 1

It is certified that error appears in the above-identified patent and that said Letters Patent is hereby corrected as shown below:

In the Specification

In Column 11, Line 12, delete "ND" and insert -- A/D --, therefor.

In Column 15, Line 29, delete "dependant dependent." and insert -- dependent. --, therefor.

In Column 16, Line 2, delete "$^{201}$Tl" and insert -- $^{201}$Tl, --, therefor.

In the Claims

In Column 18, Line 13, in Claim 1, delete "region; and" and insert -- region; --, therefor.

In Column 18, Line 56, in Claim 8, delete "is being" and insert -- is --, therefor.

Signed and Sealed this  
Thirteenth Day of March, 2018

Andrei Iancu  
*Director of the United States Patent and Trademark Office*